Feb. 2, 1926.

B. ROSENBAUM 1,571,492

PROPELLER DRIVE CONTROL

Filed Sept. 2, 1921

INVENTOR

Bruno Rosenbaum

BY

Pennie, Davis, Marvin and Edmonds

ATTORNEY

Patented Feb. 2, 1926.

1,571,492

UNITED STATES PATENT OFFICE.

BRUNO ROSENBAUM, OF BERLIN, GERMANY, ASSIGNOR TO WESTINGHOUSE ELECTRIC & MANUFACTURING COMPANY, A CORPORATION OF PENNSYLVANIA.

PROPELLER-DRIVE CONTROL.

Application filed September 2, 1921. Serial No. 498,181.

(GRANTED UNDER THE PROVISIONS OF THE ACT OF MARCH 3, 1921, 41 STAT. L., 1313.)

*To all whom it may concern:*

Be it known that I, BRUNO ROSENBAUM, residing at Berlin W. 15, Germany, have invented certain new and useful Improvements in Propeller-Drive Control (an application for a patent on said invention having been filed in Germany January 28, 1915; Sweden, December 30, 1919; Denmark, February 18, 1920; and the said German application having matured into a Patent No. 298,974, published July 18, 1919), of which the following is a specification.

This invention relates to a propeller drive for wireless sending equipment on aircraft, and particularly refers to the case where the propeller is driven by the air current generated by the main propeller and not by the air current created by the flight of the aeroplane. When this arrangement is adopted it is possible to drive the generator of the sending equipment when the craft is not in flight, as the main propeller may be kept in motion in order to drive the smaller propeller. However, the rotating speed of the main propeller and the velocity of the air current generated by it while the aircraft is at rest is not the same as when it is in flight, so that the tone pitch of the signals sent out from the wireless equipment is not the same in both cases. It is extremely difficult to determine in advance this change in the tone pitch, and in any case such determination is liable to be inaccurate. Experiments, however, have led to the conclusion that it is unnecessary to determine such difference in tone pitch and that it is sufficient to determine the correct speed of rotation for the generator by tests carried out before the flight.

In accordance with the invention this object is obtained by providing the generator propeller with any suitable means capable of controlling the speed of rotation of the generator propeller. An adjustable brake may be provided, for example a band brake, which is adapted to act on the propeller shaft and which may be applied from the operator's seat so as to control the speed of rotation of the generator. When the aircraft is landed the speed necessary for producing the proper tone pitch of the sending equipment is obtained by applying the brake, and it is desirable that notation be made of the position of the brake control so that the brake may be correctly set without experiment the next time the aircraft is landed. When the aircraft is in flight the brake may be released an amount necessary to maintain the necessary rotating speed and the proper tone pitch for the sending equipment. The amount of release of the brake may be indicated to the operator by a dial which has been calibrated by experiment. Of course this manner of controlling the speed of rotation may also be used to advantage in the case of a propeller drive which is intended to be operated only when the craft is in flight, because in such case it is possible to obtain any desired tone pitch in the sending equipment by application of the brake.

Instead of the brake one may resort to any other suitable device for controlling the speed of the generator propeller. For instance, one may mount the generator propeller so that it may be angularly displaced in the air current of the main propeller. In this case by suitably turning the propeller support so as to alter the position of the generator propeller with respect to the main propeller and the air current generated by it, the same effect is obtained as is secured by means of a brake as previously described.

A clearer undertsanding of the invention will be had from the following description of preferred embodiments as shown in the accompanying drawing. In this drawing—

Figure 1:
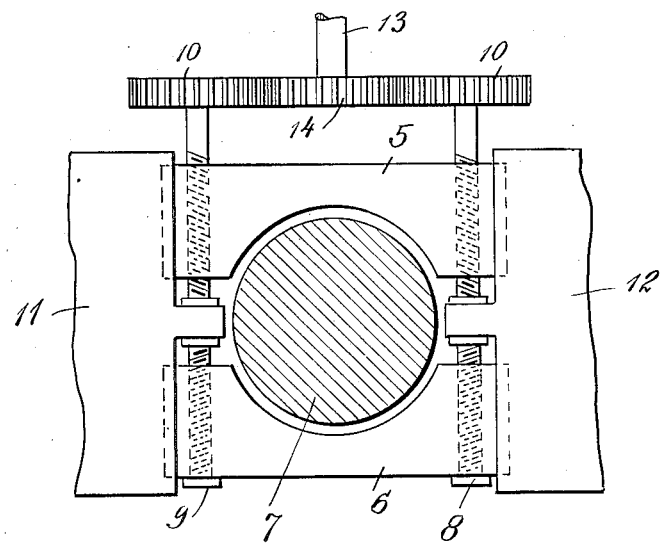
Fig. 1 illustrates an end section of the propeller drive shaft having mounted thereon a preferred form of braking means.

In the mechanism shown in Fig. 1 brake blocks 5 and 6 are disposed on opposite sides of the propeller shaft 7 at any convenient point. These blocks are mounted on the worms 8 and 9, each of which is threaded with a right and left thread and carries on its end a pinion 10. These worms are mounted in the stationary frame members 11 and 12. A control shaft 13 having on its end a pinion 14, which meshes with the pinions 10, may be operated from any convenient point to apply and release the brake. By means of this construction both brake blocks are applied evenly and are accurately controlled.

When the aeroplane is in flight and the effective air velocity on the auxiliary propeller is decreased the brake may be entirely released by turning the control shaft 13. In order to retain the same speed when the plane is landed and the propeller is rotating, the brakes may be applied an amount shown by experiment to be necessary. For convenience the amount the shaft 13 must be turned may be shown by an indicating dial of the usual form, on which various marks and notations may be made.

Figure 2:
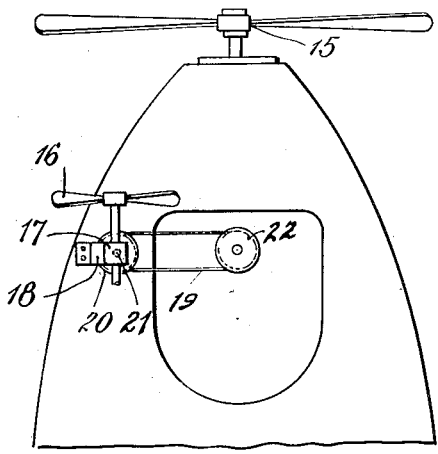
Fig. 2 is a plan view of a schematic arrangement of the main propeller and the auxiliary propeller showing means for adjusting the position of the auxiliary propeller.
Figure 3:
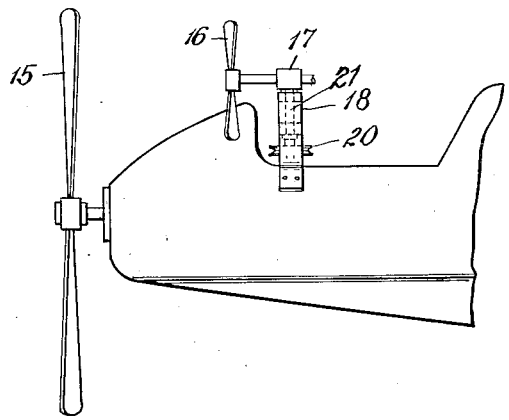
Fig. 3 is a side view showing the mounting of the auxiliary propeller and a proposed means of control.

An alternative means of controlling the auxiliary propeller speed is schematically illustrated in Figs. 2 and 3. The main propeller 15 in rotating creates a back draught which is constant in direction although varying in amount. The auxiliary propeller 16 is mounted in a suitable position in the air current of the main propeller so as to be driven by it. It is journaled in a bearing 17 which is revolubly mounted in bracket 18. In order to simplify the drawing the apparatus driven by the propeller is not shown. It is advisable, however, to have it rotatable with the propeller and shaft. A pulley 20 is mounted on the bearing support 21, and is operatively connected with a control 22, which is located near the pilot, by means of a belt or chain 19.

When the aeroplane is in flight and the effective back draught is reduced, the propeller is brought in the position shown in Fig. 2, where it utilizes the full force of air current. This is accomplished by means of the control 22, which operates in the pulley 20. In order to maintain the speed of the propeller constant as the draught increases, the support 21, and with it the propeller 16, is turned to one side or the other, so that the propeller is at an angle in the air current, and the full force of the draught in the main propeller is not effective in driving the auxiliary propeller.

I claim:

1. In combination with a propeller drive for wireless sending equipment on aircraft wherein the auxiliary propeller is driven by the air current from the main propeller, means for controlling the speed of the auxiliary propeller independently of the speed of the main propeller, comprising a brake adapted to act on the shaft of the auxiliary propeller, and means for operating said brake.

2. A propeller drive for wireless sending equipment on aircraft wherein the auxiliary propeller is driven by the air current from the main propeller, comprising a propeller, a shaft therefor adapted to be connected to the sending equipment, and means for controlling the speed of said propeller drive independently of the speed of the main propeller.

3. A propeller drive for wireless sending equipment on aircraft wherein the auxiliary propeller is driven by the air current from the main propeller, comprising a propeller, a shaft therefor adapted to be connected to the sending equipment, a brake acting on said shaft, and means for operating said brake.

4. A propeller drive for wireless sending equipment on aircraft wherein the auxiliary propeller is driven by the air current from the main propeller, comprising a propeller, a shaft therefor, two opposed brake blocks acting on said shaft, a right and left threaded stud on each side of said shaft threaded into said blocks, a pinion gear mounted on each of said studs, and a pinion gear intermediate the stud pinions whereby simultaneous operation of both studs is obtained and the brake blocks are tightened evenly upon the shaft.

In testimony whereof I affix my signature.

BRUNO ROSENBAUM.